(12) United States Patent
Bing et al.

(10) Patent No.: US 7,127,813 B2
(45) Date of Patent: Oct. 31, 2006

(54) METHOD FOR THE PRODUCTION OF PISTONS HAVING DEPRESSION EDGE ARMORING, FOR INTERNAL COMBUSTION ENGINES

(75) Inventors: Karlheinz Bing, Ramseck (DE); Gerhard Bucher, Ludwigsburg (DE)

(73) Assignee: Mahle GmbH, Stuttgart (DE)

( * ) Notice: Subject to any disclaimer, the term of this patent is extended or adjusted under 35 U.S.C. 154(b) by 402 days.

(21) Appl. No.: 10/734,807

(22) Filed: Dec. 12, 2003

(65) Prior Publication Data
US 2004/0194308 A1     Oct. 7, 2004

(30) Foreign Application Priority Data
Apr. 4, 2003    (DE) ................................ 103 15 415

(51) Int. Cl.
| B23K 15/00 | (2006.01) |
| B21K 1/18 | (2006.01) |
| B23P 11/00 | (2006.01) |
| F16J 1/04 | (2006.01) |

(52) U.S. Cl. ............................. 29/888.043; 29/888.04; 29/888.042; 29/888.044; 29/525.14; 29/411; 29/418; 92/222; 92/224

(58) Field of Classification Search ............. 29/888.04, 29/888.042, 888.043, 888.044, 505, 514, 29/525.14, 418, 411; 92/222, 224
See application file for complete search history.

(56) References Cited
U.S. PATENT DOCUMENTS
4,353,517 A * 10/1982 Rudolph ..................... 244/216
4,838,149 A * 6/1989 Donnison et al. ............. 92/222
6,604,284 B1 * 8/2003 Kato et al. ............. 29/888.043

FOREIGN PATENT DOCUMENTS
| DE | 33 04 903 | 8/1984 |
| DE | 260 844 | 10/1988 |
| DE | 101 46 079 | 4/2003 |
| JP | 63256287 | 10/1988 |
| JP | 63256287 A * | 10/1988 |

* cited by examiner

Primary Examiner—David P. Bryant
Assistant Examiner—Sarang Afzali
(74) Attorney, Agent, or Firm—Collard & Roe, P.C.

(57) ABSTRACT

A method for the production of pistons having depression edge armoring for internal combustion engines, in which a more heat-resistant armoring ring, in comparison with a forged piston blank having a combustion depression, is connected with the piston blank in the region of the depression edge. The method comprises the following steps:

a first piston blank is set on a projection of the armoring ring in the region of the depression edge;

the armoring ring is connected with the first piston blank by friction-welding;

a second piston blank is set onto the projection of the armoring ring, in such a manner that the two piston blanks do not touch;

the second piston blank is connected with the armoring ring by means of friction-welding;

a the armoring ring is cut between the piston blanks, and the pistons are given their final shape by a cutting work method.

4 Claims, 2 Drawing Sheets

METHOD FOR THE PRODUCTION OF PISTONS HAVING DEPRESSION EDGE ARMORING, FOR INTERNAL COMBUSTION ENGINES

BACKGROUND OF THE INVENTION

1. Field of the Invention

The invention relates to a method for the production of pistons having depression edge armoring, for internal combustion engines, in which a heat resistant armoring ring is connected with the piston blank in the region of the depression edge. The armoring ring according to the invention is more heat-resistant armoring compared to a forged piston blank having a combustion depression.

2. The Prior Art

In order to increase the performance of modern internal combustion engines, particularly diesel engines, the compression pressures and thereby the temperatures in the combustion space are constantly being increased. The result of this measure is that after running the engine, oxidation is found on the steel piston having a combustion depression, or on steel piston heads. This oxidation particularly occurs at the edge of the depression, as a function of the operating temperature that was reached. This oxidation can lead to the formation of cracks and thereby to failure of the component. Likewise, material wear at the piston head, along the fuel injection tracks, is also critical, and makes protection against erosion wear necessary. Known solutions for improving this situation are, for example, coating the finished piston with an oxidation-resistant layer along the edge of the depression by plasma-spraying or application welding of more oxidation-resistant materials onto the pre-finished piston.

The production of an aluminum piston is described in Japanese Patent No. JP-A 63256287, in which a trapezoid-shaped ring consisting of a more heat-resistant aluminum alloy is inserted into a combustion depression that is shaped like a truncated cone, in order to armor the depression edge. The ring is connected with the piston by pressure/friction welding. The geometric design of the ring and the combustion depression, however, have the result that material heated during the friction-welding process can escape at the parting only in the direction of the piston head, and the typical welding flash is formed there, since the material that flows in the direction of the bottom of the combustion depression cannot exit, because of the finite expanse of the face of the ring. The result of this is an insufficient joint, which is characterized by air inclusions, i.e. the formation of bubbles.

A solution that circumvents the aforementioned disadvantages is described in German Publication No. DD 260 844 A3, which describes a method for a positive-lock connection of a conically shaped armoring ring and an iron piston. The heat-resistant armoring ring has a bead-shaped ring flange and is connected with the iron piston by friction welding, in such a manner that the heated piston material, which is capable of flow, surrounds the bead-shaped contour of the ring flange and produces a connection between the piston and the armoring ring. However, the ring/piston connection is produced essentially only over the bead surface of the ring flange. Furthermore, the bead-shaped ring flange would be destroyed during removal of the welding flash, for example by means of machining, and thereby the strength of the ring/piston connection is no longer guaranteed.

SUMMARY OF THE INVENTION

It is therefore an object of the invention to provide a method for the production of a depression edge armoring of pistons of an internal combustion engine, that is more effective compared to the state of the art.

This object is achieved according to the invention by a method for the production of pistons having depression edge armoring for internal combustion engines, comprising the steps of:

setting a first piston blank on a projection of an armoring ring, in the region of the depression edge;

connecting the armoring ring with the first piston blank in the region of the depression edge by friction-welding;

setting a second piston blank onto the projection of the armoring ring in such a manner that the two piston blanks do not touch;

connecting the second piston blank with the armoring ring in the region of the depression edge, by friction-welding;

cutting the armoring ring between the piston blanks; and shaping the pistons by a cutting work method.

In a preferred embodiment, the armoring ring has two faces and is set onto the depression edge region of one of the piston blanks with one of its faces, in each instance, and exclusively connected to the piston blank with the face by friction welding.

The depression edge region of the forged piston blanks is preferably provided with a conical incline that increases radially to the outside, relative to a piston diameter. The faces of the armoring ring are also preferably structured conically, with mirror-image symmetry relative to one another, and have the same incline as the depression edge region of the piston blanks. The incline preferably comprises an angle range from 25 to 50 degrees.

The piston head produced by the step of shaping is preferably formed at least partially by one of the faces of the armoring ring.

According to the invention, a bubble-free as well as slag-free bond occurs on the piston blank, after the friction-welding process. In addition, access for removal of the flash formed as a result of the friction-welding, on both sides of the connection seam, is possible without difficulty.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
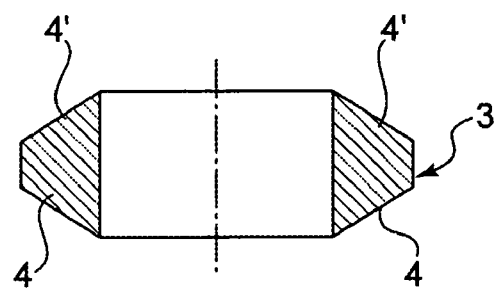
FIGS. 1A–D show schematically, the sequence of the production method according to the invention.
Figure 1B:
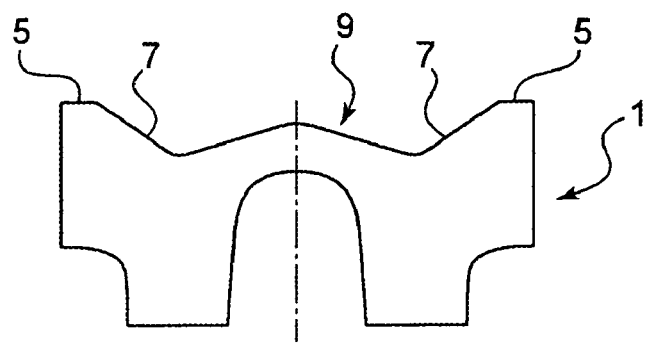
Figure 1C:
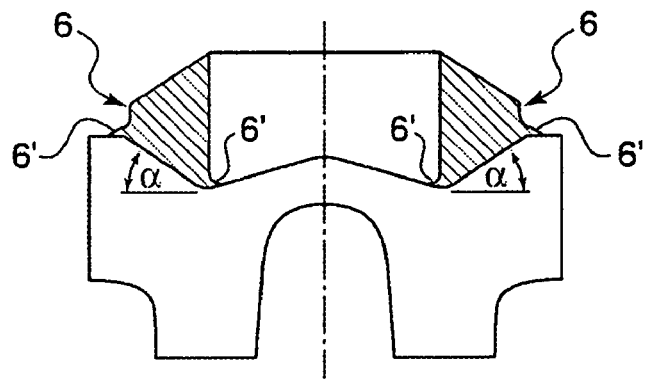
Figure 1D:
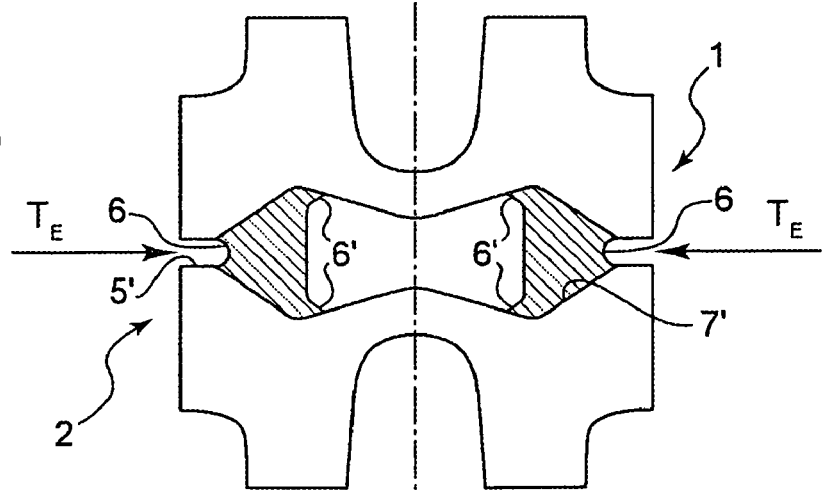

Referring now in detail to the drawings, FIG. 1 shows an armoring ring 3, having a more oxidation-resistant material than the piston material, for example X45CrSi93, inserted into a forged piston blank 1 made of annealed steel, such as 42CrMo4, which has a conical combustion depression 9 that widens radially to the outside, into the edge region 7 of the combustion depression, and connected with the piston blank by friction-welding. The face 4, and the face 4', respectively, of armoring ring 3, which demonstrate mirror symmetry, have a conical structure, analogous to the depression edge region 7 of the piston blank. It has been shown that the most optimal friction-welding results can be achieved in a range of an incline angle α from 25 to 50 degrees.

Friction-welding itself takes place exclusively over face 4 or 4' of the armoring ring. Flash 6' that results from the welding process can exit on both sides of the end points of the welding seam, without hindrance. The height of the armoring ring is structured in such a way that after the friction-welding process, it demonstrates a projection 6.

A second piston blank 2, which is structured analogous to piston blank 1, is placed onto face 4' of armoring ring 3 with its depression edge region 7', and subsequently friction welded while avoiding contact of piston heads 5 and 5', respectively. It is well known in the art that for the friction-welding process, one piston part to be welded is fixed in place, in each instance, and the other is rotated under a certain contact pressure.

Figure 2:
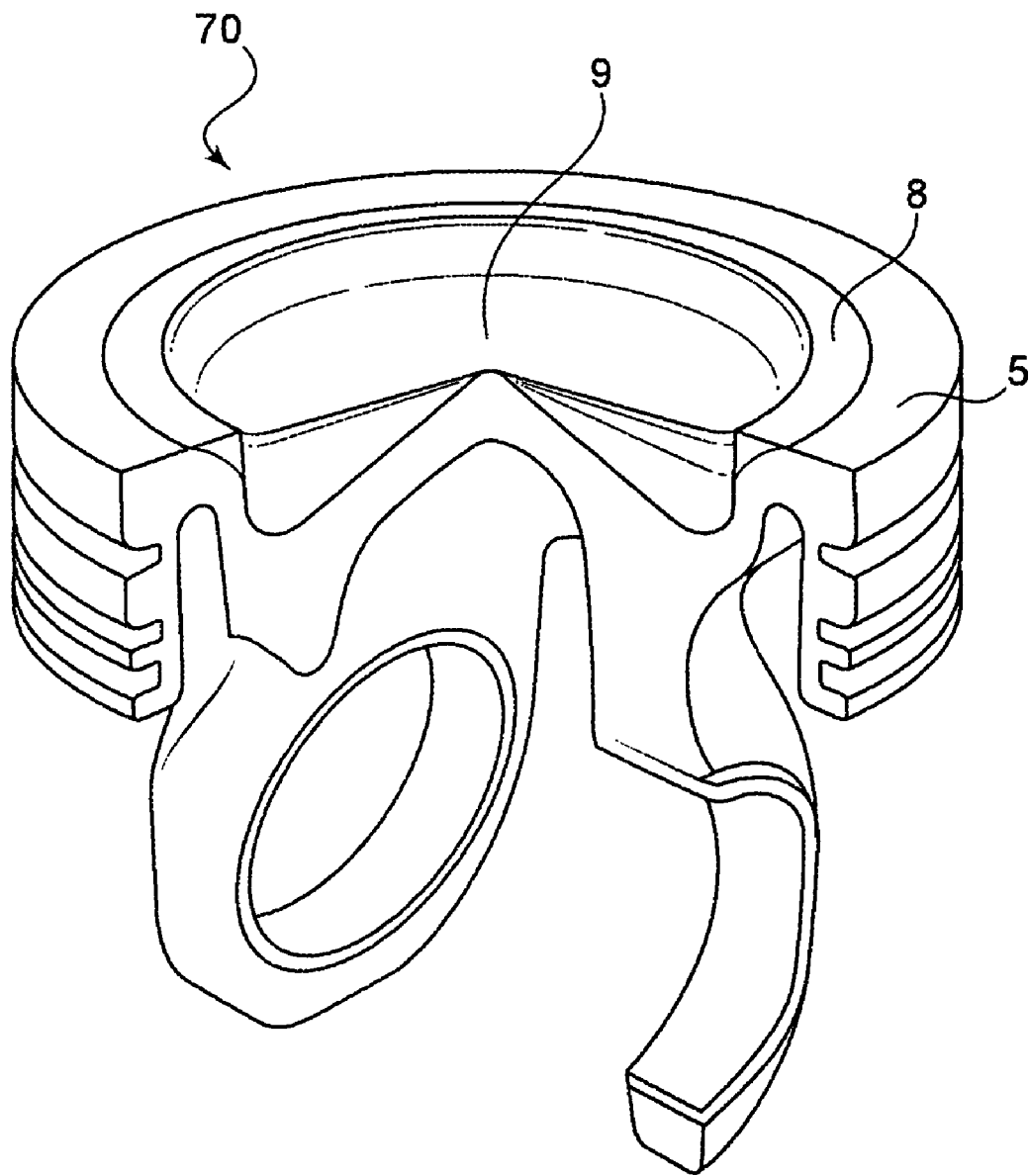
FIG. 2 shows a finished piston, produced according to the production method according to the invention.

After the two piston blanks 1 and 2 have been connected with armoring ring 3 by friction welding, armoring ring 3 is cut in a parting plane TE that is located between the pistons, and the separated piston blanks 1 and 2 are end-machined with depression edge armoring 8, by a cutting work method, as shown in FIG. 2. The application of this method is not limited to the piston type shown in FIG. 2.

Accordingly, while only a few embodiments of the present invention have been shown and described, it is obvious that many changes and modifications may be made thereunto without departing from the spirit and scope of the invention.

REFERENCE SYMBOLS

First forged piston blank 1
Second forged piston blank 2
Armoring ring 3
Faces of the armoring ring 4, 4'
Piston head, first piston blank 5
Piston head, second piston blank 5'
Projection 6
Welding flash 6'
Depression edge region of the first piston blank 7
Depression edge region of the second piston blank 7'
Depression edge armoring 8
Combustion depression 9
Finished piston for an internal combustion engine 10
Parting plane $T_E$
Finishing borders $TR_1$, $TR_2$

What is claimed is:

1. A method for the production of pistons having depression edge armoring for internal combustion engines, comprising the steps of:
   setting a first piston blank onto a projection of an armoring ring, in a region of a depression edge of the piston blank;
   connecting the armoring ring with the first piston blank in the region of the depression edge by friction-welding;
   setting a second piston blank onto the armoring ring in such a manner that the two piston blanks do not touch;
   connecting the second piston blank with the armoring ring in the region of the depression edge, by friction-welding to form a piston;
   cutting the armoring ring between the piston blanks, and shaping the pistons,
   wherein the depression edge region of the forged piston blanks is provided with a conical incline that increases radially to the outside, relative to a piston diameter, and wherein the faces of the armoring ring are structured conically, with mirror-image symmetry relative to one another, and have the same incline as the depression edge region of the piston blanks.

2. A method for the production of pistons according to claim 1, wherein the armoring ring has two faces and is set onto the depression edge region of each one of the piston blanks with a respective one of its faces, and exclusively connected to the each piston blank with said faces by friction welding.

3. A method for the production of pistons having depression edge armoring according to claim 2, wherein the piston head produced by the step of shaping is formed at least partially by one of the faces of the armoring ring.

4. A method for the production of pistons having depression edge armoring according to claim 1, wherein the incline comprises an angle range from 25 to 50 degrees.

* * * * *